Patented Mar. 5, 1940

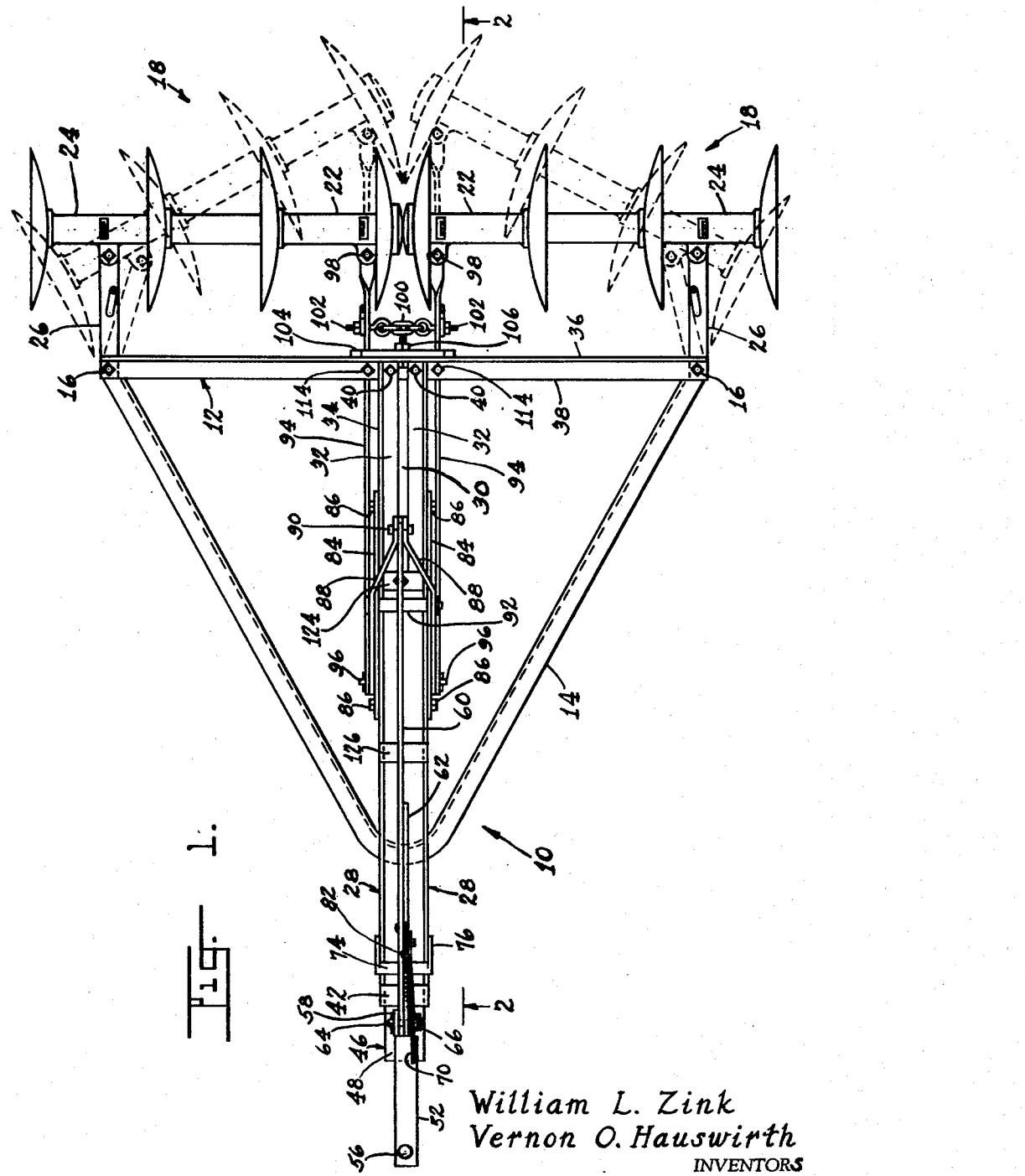

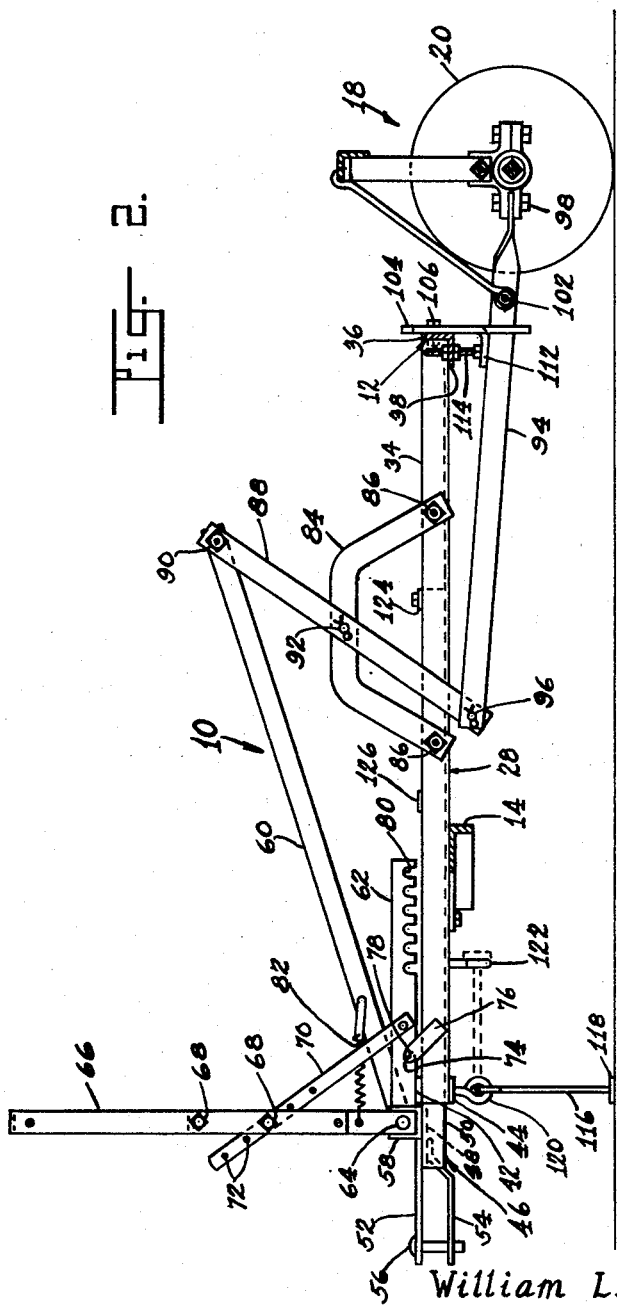

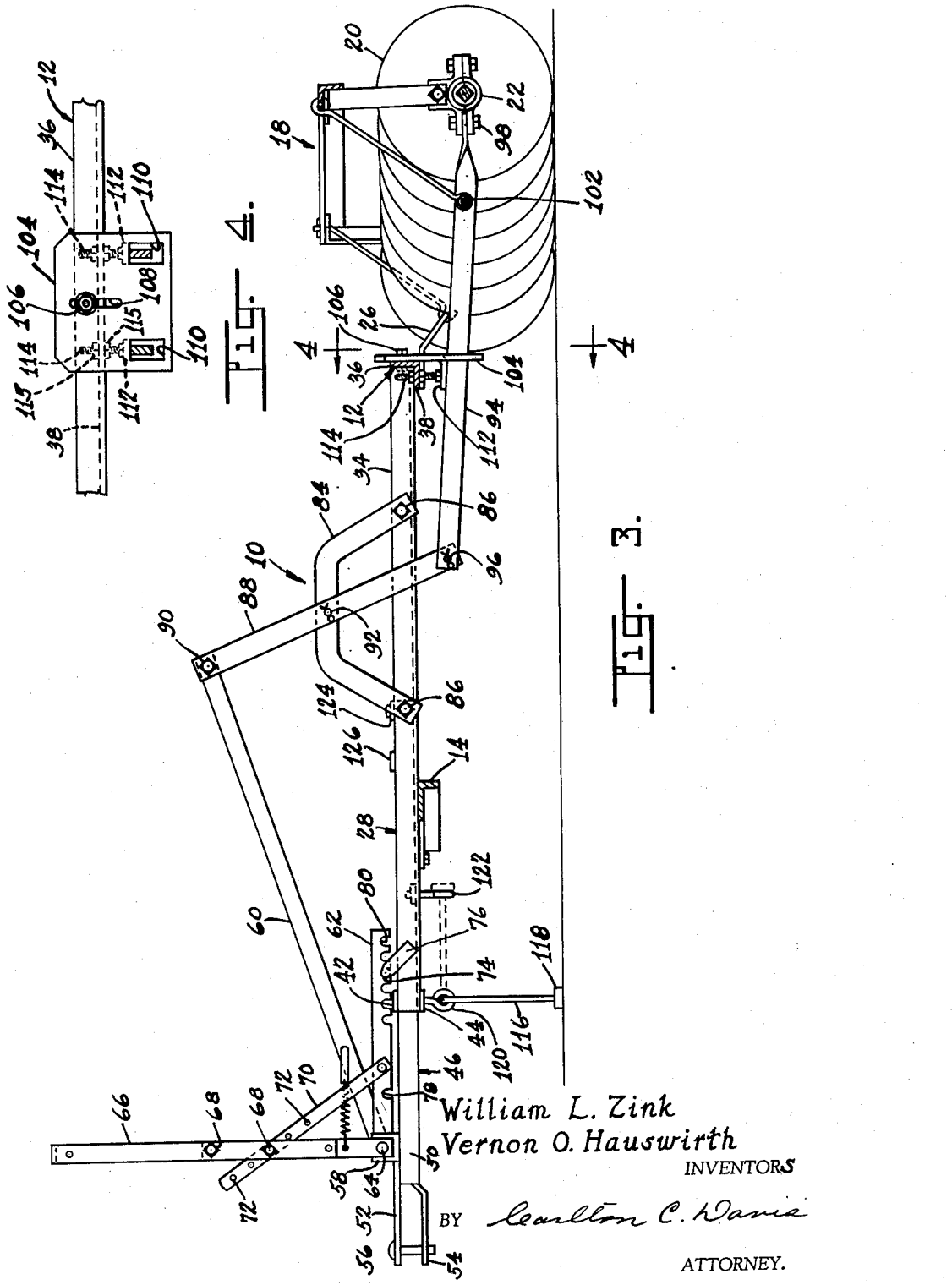

2,192,252

UNITED STATES PATENT OFFICE 2,192,252

DISK HARROW

William L. Zink, Plano, and Vernon O. Hauswirth, Kankakee, Ill., assignors to Sears, Roebuck and Co., Chicago, Ill., a corporation of New York Application January 26, 1939, Serial No. 252,946

8 Claims. (Cl. 55—81)

This invention relates generally to farm implements, and, more particularly, to disk harrows, and has for its principal object the provision of an improved disk harrow having novel means for adjustably positioning the disk.

Another important object of this invention is to provide an improved disk harrow adapted for being drawn by power means, such as a tractor, and having novel means operable by the power means for adjustably positioning the disks.

A further object of the invention is to provide an improved disk harrow construction having novel means for varying the pressure or weight on the disk.

Another important object of our invention is to provide an improved disk harrow having maximum stability in operation, and which is easily handled.

Another object of the invention is to provide an improved disk harrow having novel means for adjustably positioning the disks, which is simple and durable in construction, quickly and easily actuated, and not easily put out of order.

Other objects and advantages will be apparent from the following description, reference being had to the accompanying drawings illustrating a preferred embodiment of the invention, in which:

Figure 1 is a top plan view of a disk harrow embodying the principles of the invention;

Figure 2 is a vertical sectional view taken along the line 2—2 of Figure 1;

Figure 3 is a vertical sectional view similar to Figure 2, showing the disks and the mechanism associated therewith in alternative positions; and Figure 4 is a vertical sectional view taken along the line 4—4 of Figure 3.

In carrying out our invention we provide a disk harrow indicated generally by the reference character 10 and comprising a frame having a cross-bar 12 preferably formed from a structural angle bar. The frame also includes a V-shaped frame member 14 having the ends thereof connected to the ends of the cross-bar 12 by means of bolts 16, and is also preferably formed from a structural angle bar disposed in an inverted position.

As best shown in Figure 1, a plurality of disk units 18 is provided, each of which comprises a plurality of disks 20 mounted on a shaft which, in turn, is rotatably mounted in bearings 22 and 24. The bearings 24 of the disk units 18 are pivotally connected to arms 26 which, in turn, are swingably connected to the ends of the cross-bar 12 and the frame bar 14 by the bolts 16.

A pair of pole members 28 is disposed in spaced-apart positions for providing an opening 30 therebetween, and is preferably formed from structural angle bars for providing pole members having base flanges 32 and upwardly extending flanges 34. The pole members 28 abut the upwardly extending flange 36 of the cross-bar 12 and have their base flanges 32 fixedly connected to the mid-portion of the base flange 38 of the cross-bar 12 by means of bolts 40.

The pole members 28 have their base flanges 32 connected to the apex portion of the V-shaped frame bar 14 by any suitable means, such as bolts, not shown, and thave their outer ends connected together by top and bottom plate members 42 and 44, respectively, which are preferably welded to the pole members 28 for being made integral therewith.

An extension pole 46 is slidably disposed on the bottom flanges 32 between the upright flanges 34 of the pole members 28 and is also positioned between the fixed plate members 42 and 44 connected to the pole member. The extension pole 46 is preferably formed from a structural channel bar which is disposed in an inverted position for providing a top web portion 48 and depending side portions 50. A pair of spaced-apart members 52 and 54 is fixedly connected to the web portions 48 of the extension pole on opposite sides thereof by any suitable means, preferably by welding.

The bracket members 52 and 54 are provided with aligned openings therethrough for receiving a pin 56 for attaching the implement to any suitable power means, such as a tractor. A pair of upwardly extending lugs 58 is fixedly connected to the web portion 48 of the extension pole 46 on the top side thereof, preferably by welding.

The lugs 58 are disposed in spaced-apart positions for receiving a lever arm 60 and a latch arm 62 therebetween, the lever arm 60 and the latch arm 62 together with the lugs 58 being provided with aligned openings therethrough for receiving a pivot pin 64 which connects the lever arm and the latch arm to the lugs 58.

A manually operable lever arm 66 is pivotally mounted on the pin 64 and comprises a base member and a handle member which are connected together by bolts 68. The base member and the handle member are provided with a plurality of spaced-apart openings in order that the lever arm may be extended and the end portion of the handle member may be provided with an opening therein for having a cord or wire attached to the handle member in order that the lever arm may be actuated from a distance.

The lever arm 66 is connected to the latch arm 62, for lifting or lowering the latch arm when the lever arm is moved, by means of a link 70 which has one end pivotally connected to the latch arm and is also connected to the lever arm 66 by one of the bolts 68. The link 70 is preferably provided with a plurality of holes 72 therein in order that the lever arm 66 may be adjustably positioned relatively to the latch arm 62.

A retaining or locking bolt 74 extends over the top of the pole members 28 and is provided with depending side portions 76 fixedly connected, such as by welding, to the side flanges 34 of the pole members. The locking bolt 74 is receivable in a recess 78 of the latch arm 62 for retaining the extension pole 46 in the given position illustrated in Figure 2 relatively to the fixed pole members 28.

The latch arm 62 is further provided with a plurality of spaced-apart recesses 80, similar to the recess 78, for retaining the extension pole 46 in different selected positions relatively to the pole members 28. A spring 82 is provided for connecting the lever arm 66 to the lever arm 60 for yieldingly retaining the bolt 74 in the recesses 78 or 80 of the latch arm in which it may be disposed.

A pair of spaced-apart bracket members 84 is oppositely positioned on the extreme sides of the pole members 28 and is fixedly connected to the upwardly extending flanges 34 thereof by any suitable means, such as bolts 86.

A pair of rocker arms 88 has one end pivotally connected to the lever arm 60 by means of a bolt or pin 90 and is pivotally mounted on the bracket members 84 by a pin 92 which extends through aligned openings in the mid-portions of the bracket members 84 and the rocker arms 88. Each of the rocker arms 88 is operatively connected to a disc unit 18 by means of a connecting arm 94 having one end pivotally connected to the lower end of the rocker arm 88 by means of a pin 96, and the other end pivotally connected to the bearing 22 of the disk unit by a bolt 98.

As best shown in Figure 1, the connecting arms 94 are flexibly secured together by means of links 100 attached to eye bolts 102 which, in turn, extend through openings in the connecting arms and are provided with nuts thereon for being connected to the arms.

As best shown in Figures 3 and 4, a pressure plate 104 is adjustably connected to the cross-bar 12 by means of a bolt 106 which extends through a slotted opening 108 in the pressure plate and an opening in the upwardly extending flange 36 of the cross-bar 12. A pressure plate 104 is disposed in a vertical position on the rear side of the cross-bar 12, and the slotted opening 108 is also disposed in a vertical position on substantially the vertical center line of the plate. The pressure plate 104 is provided with a pair of openings 110 equally spaced from the vertical center line of the pressure plate through which the connecting arms 94 extend.

The pressure plate 104 is preferably formed from sheet metal and each of the openings 110 is provided therein by cutting the outline of the opening along the two sides and the bottom and bending upwardly the portion resulting from the cutting for providing a flange 112. The flanges 112 resulting from the formation of the openings 110 extend beneath the bottom flange of the cross-bar 12 and bear on the top edge of the connecting arms 94.

A pair of adjusting screws 114 extends through openings in the bottom flange 38 of the cross-bar 12 and engages the flanges 112 of the plate member 104. The adjusting screws 114 may be provided with nuts thereon for being connected to the flange 38, or the flange 38 may be provided with threaded openings therein for receiving the adjusting screws.

From the above it will be noted that the downward pressure of the cross-bar 12 resulting from the weight of the implement is exerted on the connecting arms 94 through the pressure plate 104 for holding the disks 20, and particularly the inner disks of the unit 18, in engagement with the ground.

As best shown in Figure 2, a standard 116 is provided for supporting the front end of the implement when the implement is not in operation. The standard 116 is provided with a foot portion 118 in the nature of a plate adapted for engagement with the ground, and has a looped top end for swingably connecting the standard to an eye 120, which, in turn, is secured to the plate member 44. A hook member 122 extends through the opening 30 between the pole members 28, and is slidably disposed therein with respect to the pole members for receiving the standard 116 and retaining it in the dotted line position out of engagement with the ground, as shown in Figure 2, when the implement is in operation.

From the foregoing description of the various parts of the device, the operation thereof will be readily understood.

When the implement is in the non-operating position, the disk units 18 are disposed in alignment, in which positions the disk units are shown in the solid lines in Figure 1, and the parts of the mechanism operatively associated therewith are disposed in the positions shown in Figures 1 and 2.

When the implement is drawn with the disks in their non-operating positions, the disks merely rotate without working the ground. The disk units are disposed in their non-operating positions when the implement is being drawn to or from the field of operations or is being manipulated under certain conditions. In order to work the ground, the disks 20 must be positioned at an angle with respect to the direction of travel, as illustrated in dotted lines in Figure 1.

The angle at which the disks are positioned for work in the ground is determined by the operator, means having been provided whereby the disks may be positioned at several angles in a range extending from a small angle to a relatively large angle with respect to the direction of travel.

When the implement is properly located for for having the disks work the ground, the lever arm 66 is moved forwardly by the operator for lifting the latch arm 62 out of engagement with the retaining bolt 74. The lever arm 66 is held forwardly by the operator for retaining the latch arm 62 out of engagement with the bolt 74, and the tractor or other power means connected to the extension pole 46 by means of the pin 56 is moved slowly forward.

As the extension pole 46 moves forwardly the implement frame comprising the cross-bar 12 and the V-shaped frame bar 14 remains relatively stationary as the result of the weight of the frame together with the drag resulting from the implement units.

As the extension pole 46 is moved forwardly, the forward movement of the extension pole relatively to the pole members 28 pulls the arm 60 forwardly, which results in the rocker arms 88 being rotated in a counter-clockwise direction, as viewed in Figure 2. As the rocker arms 88 are rotated, the connecting arms 94 are moved backwardly relatively to the frame for swinging the disk units 18 out of alignment and toward the dotted line positions shown in Figure 1.

For convenience, it is assumed that the operator desires the disks 20 to be disposed in the dotted line position shown in Figure 1 for working the ground. The lever arm 66 is held forwardly by the operator during the movement of the extension pole 46 relatively to the implement frame until the disks are disposed in the positions desired, at which time the lever arm 66 is released and the latch arm 62 is moved downwardly by the spring 82 for receiving the locking bolt 74 in one of the recesses 80 for fixedly retaining the disks 20 of the disk units 18 at the desired angle with respect to the direction of travel.

In order that the extension pole 46 may not be accidentally drawn so far out from the pole members 28 as to damage the mechanism for shifting the positions of the disk units or the disks themselves, a stop element 124 is connected to the top web portion 48 of the extension pole 46 at the rear end thereof, and is adapted for engagement with a fixed stop member 126 fixedly secured to the top of the upwardly extending flanges 34 of the pole members 28 when the extension pole 46 is pulled forwardly a given distance from the pole members 28.

Figure 3 illustrates the positions of the movable parts of the implement mechanism wherein the disk units are disposed in the dotted line positions shown in Figure 1.

It will be noted that the implement pole comprising the pole members 28 and the extension pole 46 has its minimum length when the disk units are in their non-operating positions and is extended as the disks are moved to operating positions so that the implement pole has its greatest over-all length when the implement disks are positioned at the greatest angle with respect to the direction of travel.

This feature of extending the pole in proportion to the working angle of the disks provides greater stability of the implement in operation which results from a long hitch connection. It will be noted, of course, that in moving the disks from their working positions to their non-operating positions it is merely necessary to reverse the operations above described for telescoping the extension pole 46 into the pole members 28.

It will be noted that the weight of the implement exclusive of the disk units is carried by the bearings 22 and 24 of the disk units and that the weight is transmitted to the bearings through the arms 26 and the connecting arms 94. Normally, the weight of the implement should be evenly distributed on the bearings 22 and 24 in order that all of the disks should work the ground at an even depth. In practice, however, it has been found that when the cultivator disks 20 are disposed in their working positions as represented in the dotted lines in Figure 1, the inward pressure of the ground on the bottom of the disks tends to lift the inner disks of the units out of engagement with the ground, thereby resulting in the ground being worked at an uneven depth. In order to compensate for this lifting effect so that all of the disks will work the ground at the same depth, it is necessary to place the greater part or all of the load resulting from the implement frame on the connecting arms 94, which load is transmitted to the inner bearings 22 for holding the inner disk in the ground.

The pressure plate 104 is provided for adjusting the distribution of the load on the arms 26 and the connecting arms 94, as well as transmitting the desired proportion of the load to the connecting arms 94. The pressure plate 104 is adjusted for effecting a proper distribution of the load by first loosening the locking bolt 106 in order that the pressure plate may be moved with respect to the cross-bar 12. The pressure plate 104 may then be moved downwardly by turning the adjustment screws 114 or the nuts 115, disposed thereon, in the proper direction for exerting greater pressure on the connecting arms 94 and relieving the arms 26 of a part of the load carried thereby.

After the pressure plate 104 is disposed in the proper position, the bolt 106 may again be tightened for locking the pressure plate to the crossbar 12. In like manner, the pressure on the connecting arms 94 may be reduced by reversing the rotation of the adjustment screws 114 or the nuts disposed thereon.

We claim:

1. A disk harrow comprising a frame having a forwardly extending and centrally positioned pole member fixedly connected therewith, a disk gang positioned rearwardly of the frame and pivotally connected therewith, an arm pivotally connected to the disk gang and extending forwardly beneath the frame, an extension pole slidably mounted on the fixed pole and operatively connected to the arm for moving the disk gang to different positions, a depending bracket plate adjustably connected to the frame and provided with an opening through which the arm extends, said bracket plate having a shelf portion positioned above the opening, and an adjustment member in engagement with the shelf portion for positioning the bracket plate relatively to the frame.

2. A disk harrow comprising a frame having a forwardly extending and centrally positioned pole member fixedly connected therewith, a pair of disk gangs positioned rearwardly of the frame and having outer portions thereof pivotally connected to the frame, a pair of spaced arms pivotally connected to inner portions of the disk gangs and extending forwardly beneath the frame, an extension pole slidably mounted on the fixed pole member and operatively connected to the spaced arms for moving the disk gangs, and a depending bracket plate adjustably connected to the frame and provided with a pair of spaced shelf portions having openings therebeneath through which the arms extend, and adjustment members in engagement with the shelf portions for adjustably positioning the bracket plate relatively to the frame.

3. A disk harrow comprising a frame having a forwardly extending and centrally positioned pole member fixedly connected therewith, a disk gang positioned rearwardly of the frame and pivotally connected therewith, an arm pivotally connected to the disk gang and extending forwardly beneath the frame, an extension pole slidably mounted on the fixed pole and operatively connected to the arm for moving the disk gang to different positions, a depending bracket plate adjustably connected to the frame and formed for providing a shelf portion having an opening therebeneath through which the arm extends and an adjustment member in engagement with the shelf portion for positioning the bracket plate relatively to the frame.

4. A disk harrow comprising a frame having a forwardly extending and centrally positioned pole member fixedly connected therewith, a pair of disk gangs positioned rearwardly of the frame and having outer portions thereof pivotally connected to the frame, a pair of spaced arms pivotally connected to inner portions of the disk gangs and extending forwardly beneath the frame, an extension pole slidably mounted on the fixed pole member and operatively connected to the spaced arms for moving the disk gangs, and a depending bracket plate adjustably connected to the frame, said bracket plate having a pair of spaced projecting shelf portions formed therefrom and providing openings positioned beneath the shelf portions through which the arms extend, and adjustment members in engagement with the shelf portions for adjustably positioning the bracket plate relatively to the frame.

5. A disk harrow comprising a frame having a forwardly extending and centrally positioned pole member fixedly connected therewith, a pair of disk gangs positioned rearwardly of the frame and having outer portions thereof pivotally connected to the frame, a pair of spaced arms pivotally connected to inner portions of the disk gangs and extending forwardly beneath the frame, an extension pole slidably mounted on the fixed pole member and operatively connected to the spaced arms for moving the disk gangs, and a depending bracket plate adjustably connected to the frame, said bracket plate having a pair of spaced projecting shelf portions formed therefrom and providing openings positioned beneath the shelf portions through which the arms extend, and adjustment screws connected to the frame and in engagement with the shelf portions for adjustably positioning the bracket plate relatively to the frame.

6. A disk harrow comprising a frame having a forwardly extending and centrally positioned pole member fixedly connected therewith, a pair of disk gangs positioned rearwardly of the frame and having outer portions thereof pivotally connected to the frame, a pair of spaced arms pivotally connected to inner portions of the disk gangs and extending forwardly beneath the frame, an extension pole slidably mounted on the fixed pole member and operatively connected to the spaced arms for moving the disk gangs, and a depending bracket plate adjustably connected to the frame and provided with a pair of spaced shelf portions having openings therebeneath through which the arms extend, adjustment members in engagement with the shelf portions for adjustably positioning the bracket plate relatively to the frame, and linkage connected to the arms and positioned between the bracket plate and the disk gangs for tying the arms together.

7. A disk harrow comprising a frame having a pair of forwardly extending and centrally positioned bar members fixedly connected therewith and disposed in substantially parallel relationship, an extension pole slidably mounted between the bar members, a disk gang positioned at the rear of the frame and swingably connected therewith, a stop element connected to the bar members and extending over the extension pole, pivot means connected to the extension pole and positioned forwardly of the stop element, linkage connecting the disk gang to the pivot means for adjustably positioning the disk gang when the extension pole is moved relatively to the bar members, a rack arm connected to the pivot means and extending rearwardly therefrom over the stop element, said rack arm being provided with recesses for receiving the stop element and retaining the disk gang in the adjusted positions, and a manually operable lever connected to the pivot means and the rack arm for moving the rack arm out of engagement with the stop element.

8. A disk harrow comprising a frame having a pair of forwardly extending and centrally positioned bar members fixedly connected therewith and disposed in substantially parallel relationship, an extension pole slidably mounted between the bar members, a disk gang positioned at the rear of the frame and swingably connected therewith, a stop element connected to the bar members and extending over the extension pole, pivot means connected to the extension pole and positioned forwardly of the stop element, linkage connecting the disk gang to the pivot means for adjustably positioning the disk gang when the extension pole is moved relatively to the bar members, a rack arm connected to the pivot means and extending rearwardly therefrom over the stop element, said rack arm being provided with recesses for receiving the stop element and retaining the disk gang in the adjusted positions, a manually operable lever connected to the pivot means and the rack arm for moving the rack arm out of engagement with the stop element, and spring means connected to the lever and an element of the linkage for yieldingly retaining the rack arm in engagement with the stop element.

WILLIAM L. ZINK.
VERNON O. HAUSWIRTH.